United States Patent [19]
Tsuda

[11] Patent Number: 6,088,573
[45] Date of Patent: Jul. 11, 2000

[54] TRANSMISSION POWER CONTROL METHOD AND APPARATUS FOR MOBILE RADIO SATELLITE COMMUNICATION SYSTEM

[75] Inventor: Hiroki Tsuda, Tokyo, Japan

[73] Assignee: NEC Corporation, Tokyo, Japan

[21] Appl. No.: 09/086,212

[22] Filed: May 28, 1998

[30] Foreign Application Priority Data

May 28, 1997 [JP] Japan .................................. 9-138218

[51] Int. Cl.⁷ ............................ H04B 7/185; H04B 7/00; H04Q 7/20
[52] U.S. Cl. ......................... 455/13.4; 455/522; 455/427
[58] Field of Search .................................. 455/13.4, 522, 455/427, 12.1, 67.3, 67.1, 69, 450, 451, 452, 453, 584, 430, 63, 68, 226.1, 226.3, 296, 436–439; 342/353, 354; 375/346; 370/331–333, 335, 342

[56] References Cited

U.S. PATENT DOCUMENTS

| | | | |
|---|---|---|---|
| 5,412,686 | 5/1995 | Ling ................................... | 455/67.1 X |
| 5,487,180 | 1/1996 | Ohtake ................................ | 455/69 X |
| 5,768,684 | 6/1998 | Grubb et al. ........................ | 455/13.4 |
| 5,771,461 | 6/1998 | Love et al. .......................... | 455/522 |
| 5,806,003 | 9/1998 | Jolma et al. ......................... | 455/522 |
| 5,809,420 | 9/1998 | Ichiyanagi et al. ................. | 455/12.1 X |
| 5,815,798 | 9/1998 | Bhagalia et al. ..................... | 455/13.4 |
| 5,826,170 | 10/1998 | Hirschfield et al. ................. | 455/13.4 |
| 5,835,846 | 11/1998 | Furukawa et al. .................. | 455/13.4 X |
| 5,924,015 | 7/1999 | Garrison et al. ..................... | 455/13.4 |
| 5,933,781 | 8/1999 | Willenegger et al. ............... | 455/522 |
| 5,991,627 | 11/1999 | Honkasalo et al. .................. | 455/437 |

FOREIGN PATENT DOCUMENTS

| | | |
|---|---|---|
| 59-154826 | of 1984 | Japan . |
| 60-176338 | of 1985 | Japan . |
| 8-237194 | of 1996 | Japan . |

*Primary Examiner*—Dwayne D. Bost
*Assistant Examiner*—Tracy M. Legree
*Attorney, Agent, or Firm*—Ostrolenk, Faber, Gerb & Soffen, LLP

[57] ABSTRACT

The invention provides a transmission power control apparatus for a mobile radio satellite communication system which allows frame synchronization maintenance and synchronization acquisition of a receiving station and optimum transmission power control with a simple construction which does not effect complicated control. The transmission power control apparatus includes a transmission power control loop provided in each of a gateway station and a terminal/mobile station for controlling a transmission power of the station. The transmission level during transmission is monitored and compared with a preset transmission level to change over an average time for sampling of the error between the transmission levels to vary the response speed of the transmission power control loop. When the channel for current use is to be changed over from a signalling channel to a communication channel, the transmission power is controlled so that there is no trouble for continuous synchronization of the reception side. But, when the channel is to be changed over from the communication channel to the signalling channel, the transmission power is controlled rapidly to a standard level so that there is no trouble in synchronization acquisition or data transmission.

9 Claims, 5 Drawing Sheets

TRANSMISSION POWER CONTROL METHOD AND APPARATUS FOR MOBILE RADIO SATELLITE COMMUNICATION SYSTEM

BACKGROUND OF THE INVENTION

1. Field of the Invention

The present invention relates to a transmission power control method and apparatus for a mobile radio satellite communication system, and more particularly to a transmission power control method and apparatus for a mobile radio satellite communication system which controls the transmission power based on received control information of a transmission power particularly when a channel is switched.

2. Description of the Related Art

A satellite communication system which effects channel access of the single channel per carrier (SCPC)/frequency division multiple access (FDMA) system based on a demand assignment is described first. Referring to FIG. 3, a satellite communication system of the type mentioned is shown and normally includes a network control station 11 which manages and controls the communications system, gateway stations 12 each connected to public switched telephoney networks (PSTN) or private telephone networks, terminals and mobile stations (hereinafter referred to as terminals/mobile stations) 13 through which users access the satellite communication network, and a communication satellite 14.

The network control station 11 supervises the entire network and successively transmits channel signalling information by time division multiplex (TDM) communication using a forward link (also called outbound). The TDM communication includes information of an incoming call and a used communication channel. Each of the gateway stations 12 and the terminals/mobile stations 13 receives information transmitted thereto by the time division multiplex communication and effects call request and responding to an incoming call based on the received information using a return link (inbound). The return link is used for transmission of a call request and incoming call responding burst signal transmitted from each of the gateway stations 12 and terminals/mobile stations 13 in a predetermined time slot in accordance with line information of time division multiplex communication in a time division multiple access (TDMA).

If the network control station 11 receives a call request and an incoming call response signal transmitted from one of the gateway stations 12 and one of the terminals/mobile stations 13 (including an indirect case wherein a terminal or a mobile station transmits a call request to a gateway station and then the gateway station transmits a channel assignment request), then it informs the gateway station 12 and the terminal/mobile station 13 of an available communication channel over a signalling channel 15. Then, when the gateway station 12 and the terminal/mobile station 13 receive the designated communication channel, they set the channel so that a communication channel 16 is thereafter used in place of the signalling channel 15. Then, through a predetermined sequence, the terminal/mobile station 13 is connected to a PSTN or private switched network (PSTN)/private switched network 17) through the communication satellite 14 and the gateway station 12.

The signalling channel 15 which communication control information therethrough in such a sequence of channel connection operations as described above communicates control information normally using a prescribed maximum transmission level as a standard level so that call connection can be effected stably even in a geographical condition wherein the elevation angle is small (which is the most critical communication condition in call connection) in order to assure a high degree of reliability of the communication system. After changeover to a communication channel, the transmission level is adjusted so as to minimize interference with another communication channel and allow the most efficient utilization of power of the satellite. Further, in a mobile terminal which is driven by a battery, power dissipation is minimized by such transmission level control to allow utilization for a long time.

The transmission powers of the gateway station 12 and the terminal/mobile station 13 or the communication system described above are controlled each by such an apparatus as shown in FIG. 4. Referring to FIG. 4, the apparatus shown includes a transmission power controller 1 for controlling the transmission power of a modulation signal frequency converted by a frequency converter not shown, a power amplifier 2 for power amplifying an output of the transmission power controller 1 to a predetermined transmission power and outputting the power amplified signal to an antenna not shown, a level detector 3 for detecting the output level of the power amplifier 2, a comparator 6 for comparing the transmission level detected by the level detector 3 with a preset transmission reference level to obtain a level error, and an averaging circuit 9 for averaging the level error from the comparator 6 and controlling the transmission power controller 1 with the averaged level error.

In operation, upon transmission over the signalling channel 15, the transmission level is set to the maximum standard transmission level, and the level of a transmission signal detected by the level detector 3 during transmission is compared with the preset transmission level value by the comparator 6 to obtain a level error. The level error of the detected level from the preset transmission reference level is averaged by the averaging circuit 9. Then, the transmission power is controlled so that, if the detected transmission signal level is higher than the preset transmission level value, then the transmission signal level may be decreased, but if the detected transmission signal level is lower than the preset transmission level, then the decrease of the transmission signal level may be decreased.

A channel is assigned in response to the channel assignment request in the signalling channel 15, and communication by the communication channel 16 is started. After the communication by the communication channel 16 is started, the terminal/mobile station 13 and the gateway station 12 individually measure the reception levels thereof, set optimum transmission levels for operation of the system and control the transmission powers thereof. Such control is disclosed, for example, in Japanese Patent Laid-Open Application No. Heisei 8-237194. The transmission power control for the communication channel 16 is performed in a similar manner as that for the communication channel 16 except that the preset transmission level values set for the comparators are different.

After the communication over the communication channel 16 is completed, communication by the signalling channel 15 is entered again. Then, the transmission signal level is set to the standard maximum transmission level, but is then controlled, upon transmission, to the predetermined transmission power by the operation described above.

While the transmission level is controlled in accordance with the procedure described above so that possible interference between communication channels may be minimized and the power of the satellite may be utilized most efficiently, if the control step of the transmission level becomes large, the following trouble occurs.

FIG. 5 represents transmission powers when a channel to be used is changed over between a signalling channel and a communication channel.

When the transmission level of the self station after communication over the communication channel is started is to be decreased to the lowest level because the reception level of the other party station is sufficiently high, it is varied at a rate which can be followed up sufficiently so that synchronization can be held on the reception side against a variation in amplitude or phase. When the communication is terminated while the transmission power is controlled stably with the lowest transmission level and then communication over the signalling channel is entered again, the transmission level is set to the standard highest transmission level in preparation for next transmission. When a control signal burst such as a call request or an incoming call response is to be transmitted subsequently over the signalling channel, the top of the burst is transmitted with the level controlled to the lowest level over the communication channel and the burst is started while the transmission level is controlled so as to increase to the highest level.

Therefore, it sometimes occurs that a carrier power to noise power ratio required by the communication system is not obtained and this gives rise to a trouble in synchronization acquisition or data transmission. Particularly, a top portion of a burst includes a training sequence and/or a unique word for carrier synchronization and/or clock synchronization and plays an important role for transmission of a data part.

If, on the contrary, the transmission level control response over the signalling channel is made faster so as to allow quick convergence to a predetermined transmission level in order to eliminate the problem described above, then such a problem may possibly occur that, when the transmission level is controlled after reception level information of the other party station is received over the communication channel, frame synchronization of the other party station cannot be maintained or that the transmission power control becomes unstable. Such problems are significant particularly where the transmission level control step is large.

SUMMARY OF THE INVENTION

It is an object of the present invention to provide a transmission power control method and apparatus for a mobile radio satellite communication system which allows frame synchronization maintenance and synchronization acquisition of a receiving station and optimum transmission power control with a simple construction which does not effect complicated control.

In order to attain the object described above, according to an aspect of the present invention, there is provided transmission power control method for a mobile radio satellite communication system wherein a gateway station and a terminal/mobile station effect communication by a demand assignment using a signalling channel and a communication channel via a communication satellite, comprising the stop of controlling a transmission power control loop provided in any of the gateway station and the terminal/mobile station for controlling a transmission power of the gateway station or terminal/mobile station so that, when a transmission channel for current use is to be changed over from the signalling channel to the communication channel, a response speed of the transmission power control loop is set to a low value, but when the transmission channel for current use is to be changed over from the communication channel to the signalling channel, the response speed of the transmission power control loop is set to a high value.

According to another aspect of the present invention, there is provided a transmission power control apparatus for a mobile radio satellite communication system wherein a gateway station and a terminal/mobile station effect communication by a demand assignment using a signalling channel and a communication channel via a communication satellite, comprising a transmission power control loop provided in each of the gateway station and the terminal/mobile station for controlling a transmission power of the gateway station or terminal/mobile station, and control means for controlling the transmission power control loop of each of the gateway station and the terminal/mobile station so that, when a transmission channel for current use is to be changed over from the signalling channel to the communication channel, a response speed of the transmission power control loop is set to a low value, but when the transmission channel for current use is to be changed over from the communication channel to the signalling channel, the response speed of the transmission power control loop is set to a high value.

The transmission power control apparatus may be constructed such that the signalling channel is used for communication with the gateway station, the terminal/mobile station and a network control station, and the transmission power levels of the gateway station and the terminal/mobile station are set to the highest level. Further, the transmission power control apparatus may be constructed such that the communication channel is used for communication between the gateway station and the terminal/mobile station, and the transmission power levels of the gateway station and the terminal/mobile station are set to an optimum transmission level based on a reception level detected by one and transmitted to the other of the gateway station and the terminal/mobile station.

The transmission power control loop may include a transmission power controller for receiving an input signal and controlling a transmission level for the signal in accordance with a control signal, comparison means for detecting a transmission level of an output of the transmission power controller and comparing the detected transmission level with a preset transmission level to detect an error level of the detected transmission level from the preset transmission level, averaging means for controlling the response speed of the transmission power control loop based on the error level detected by the comparison means, and means for receiving an output of the averaging means and a producing a control signal controlling the transmission power controller so that the error level may be minimized.

The averaging means may include discrimination means for discriminating a polarity of the error level, conversion means for converting the error level from an analog signal into a digital signal for a period corresponding to a predetermined sample number, selection means for selecting the predetermined sampling number from within a plurality of average sample numbers based on an output of the discrimination means, and control means for averaging a number of error levels successively outputted after each fixed interval of time from the comparison means which is equal to the predetermined sample number selected by the selection means to obtain a digital signal to be used as the control signal for the transmission power controller.

Alternatively the averaging means may include discrimination means for discriminating a polarity of the error level, a filter for receiving error level, the filter having a cutoff frequency which is variable in response to a control signal, selection means for selecting the cutoff frequency of the filter based on an output of the discrimination means, and control means for controlling the transmission power controller through the filter with the cutoff frequency selected by the selection means.

According to a further aspect of the present invention, there is provided a transmission power control apparatus for a mobile radio satellite communication system wherein a gateway station and a terminal/mobile station effect communication by a demand assignment using a signalling channel and a communication channel via a communication satellite, the transmission power control apparatus being provided in each of the gateway station and the terminal/mobile station, the transmission power control apparatus comprising a transmission power controller for receiving an input signal and controlling a transmission level for the signal in accordance with a control signal, a power amplifier for power amplifying an output of the transmission power controller to a predetermined transmission level, a level detector for detecting a transmission level of an output of the power amplifier, a control circuit for analyzing reception information transmitted from the other one of the gateway station and the terminal/mobile station to set an optimum transmission level, a comparison circuit for comparing the transmission level detected by the level detector with the optimum transmission level, a discrimination circuit for discriminating a polarity of an output signal of the comparison circuit and outputting a selection control signal for an average sample number or average time, a selection circuit for selecting an average sample number in accordance with the selection signal from the discrimination circuit, and an averaging circuit for averaging a number of error levels successively outputted after each fixed interval of time from the comparison circuit which is equal to the average sample number designated by the selection circuit to obtain a digital signal to be used as the control signal for the transmission power controller.

According to a still further aspect of the present invention, there is provided a transmission power control apparatus for a mobile radio satellite communication system wherein a gateway station and a terminal/mobile station effect communication by a demand assignment using a signalling channel and a communication channel via a communication satellite, the transmission power control apparatus being provided in each of a transmission section of the gateway station and the terminal/mobile station, the transmission power control apparatus comprising a transmission power controller for receiving an input signal and controlling a transmission level for the signal in accordance with a control signal, a power amplifier for power amplifying an output of the transmission power controller to a predetermined transmission level, a level detector for detecting a transmission level of an output of the power amplifier, a control circuit for analyzing reception information transmitted from the other one of the gateway station and the terminal/mobile station to set an optimum transmission level, a comparison circuit for comparing the transmission level detected by the level detector with the optimum transmission level, a discrimination circuit for discriminating a polarity of an output signal of the comparison circuit and outputting a selection signal for selecting a filter cutoff frequency, a selection circuit for selecting a filter cutoff frequency in response to the selection signal from the discrimination circuit, and an averaging circuit including a filter of a variable cutoff frequency for averaging a number of error levels successively outputted after each fixed interval of time from the comparison circuit which corresponds to the cutoff frequency designated by the selection circuit to obtain a digital signal to be used an the control signal for the transmission power controller.

With the transmission power control method and apparatus described above, the transmission level during transmission is monitored and the monitored transmission level is compared with a preset transmission level to change over the average time for sampling of the error between the transmission levels to vary the response speed with a simple construction which does not require complicated control. Consequently, when the channel for current use is to be changed over from a signalling channel to a communication channel, the transmission power is controlled so that there is no trouble for synchronization maintenance of the reception side. On the other hand, when the channel for current use is to be changed over from the communication channel to the signalling channel, the transmission power is controlled rapidly to a standard level so that there is no trouble in synchronization acquisition or data transmission.

The above and other objects, features and advantages of the present invention will become apparent from the following description and the appended claims, taken in conjunction with the accompanying drawings in which like parts or elements are determined by like reference symbols.

DESCRIPTION OF THE PREFERRED EMBODIMENT

Figure 1:
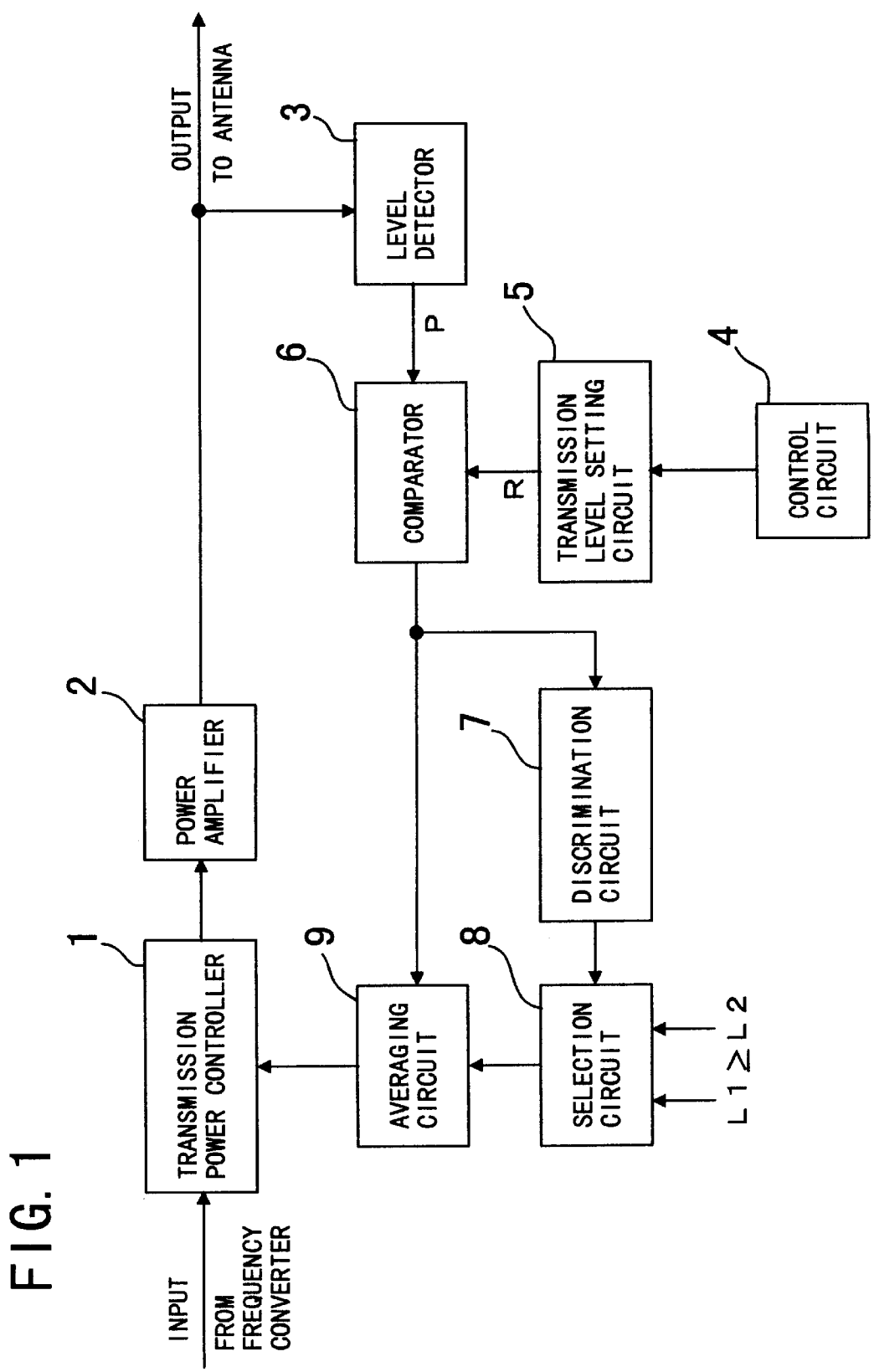
FIG. 1 is a block diagram of a transmission section of a gateway station and a terminal/mobile station to which a transmission power control apparatus according to the present invention is applied.
Figure 2:
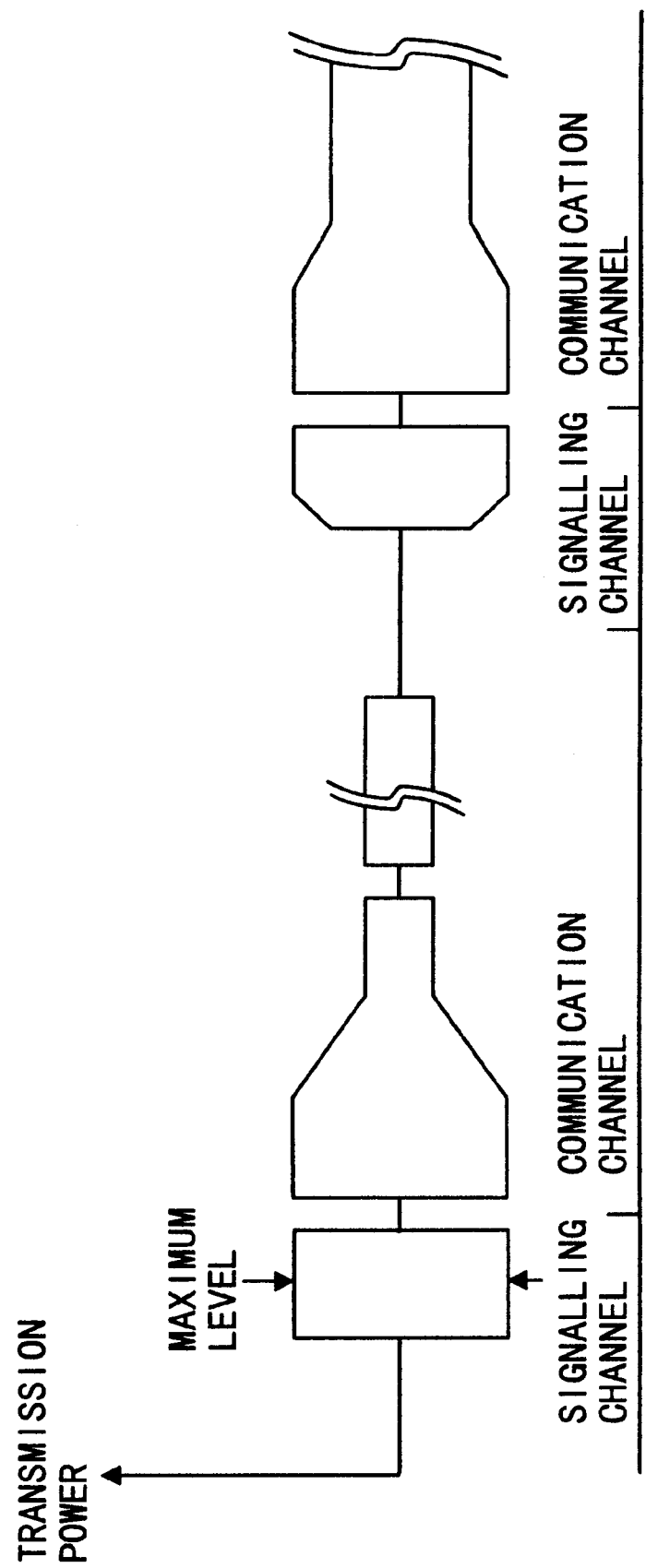
FIG. 2 is a time chart illustrating a variation of the transmission power by the transmission power control apparatus shown in FIG. 1.
Figure 3:
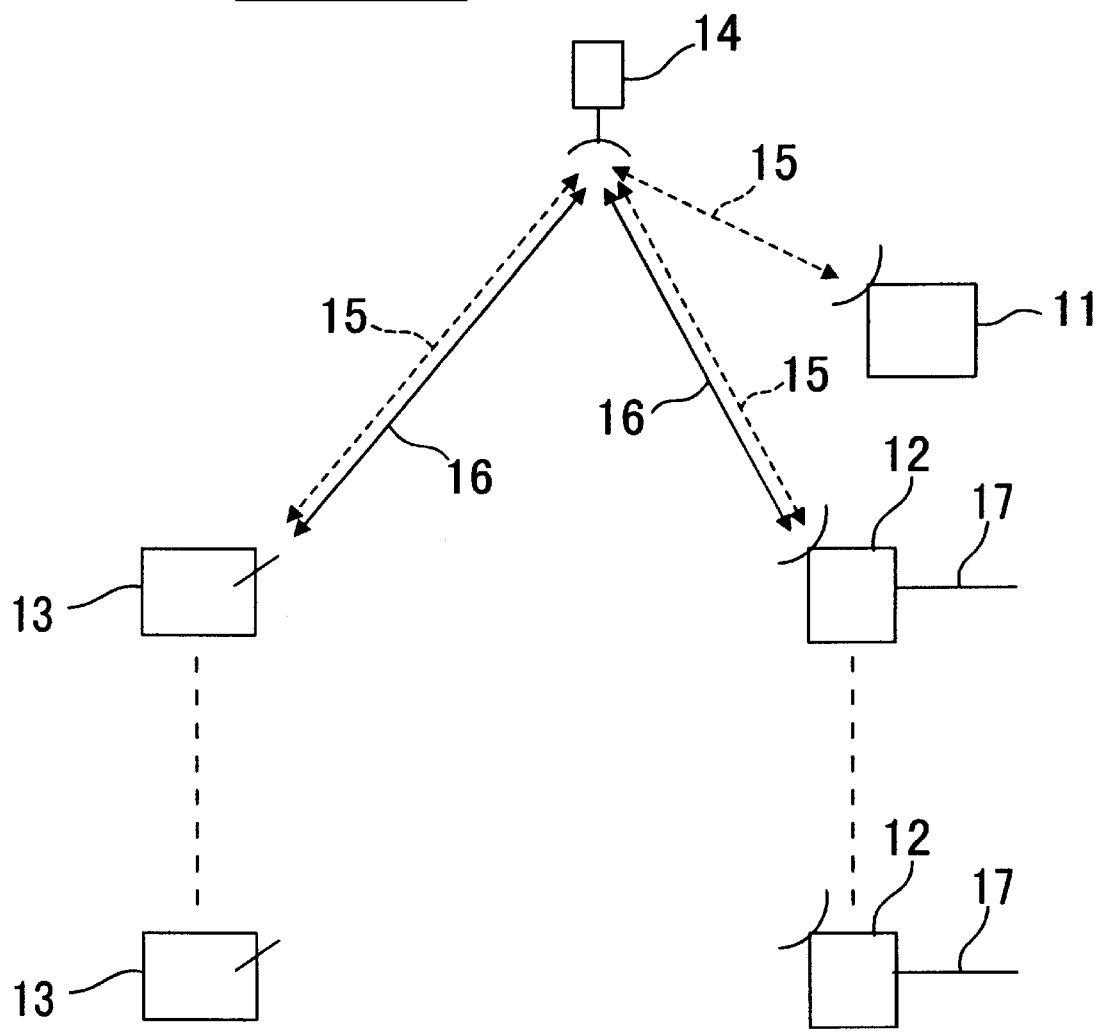
FIG. 3 is a block diagram showing a basic construction of an ordinary mobile radio satellite communication system.
Figure 4:
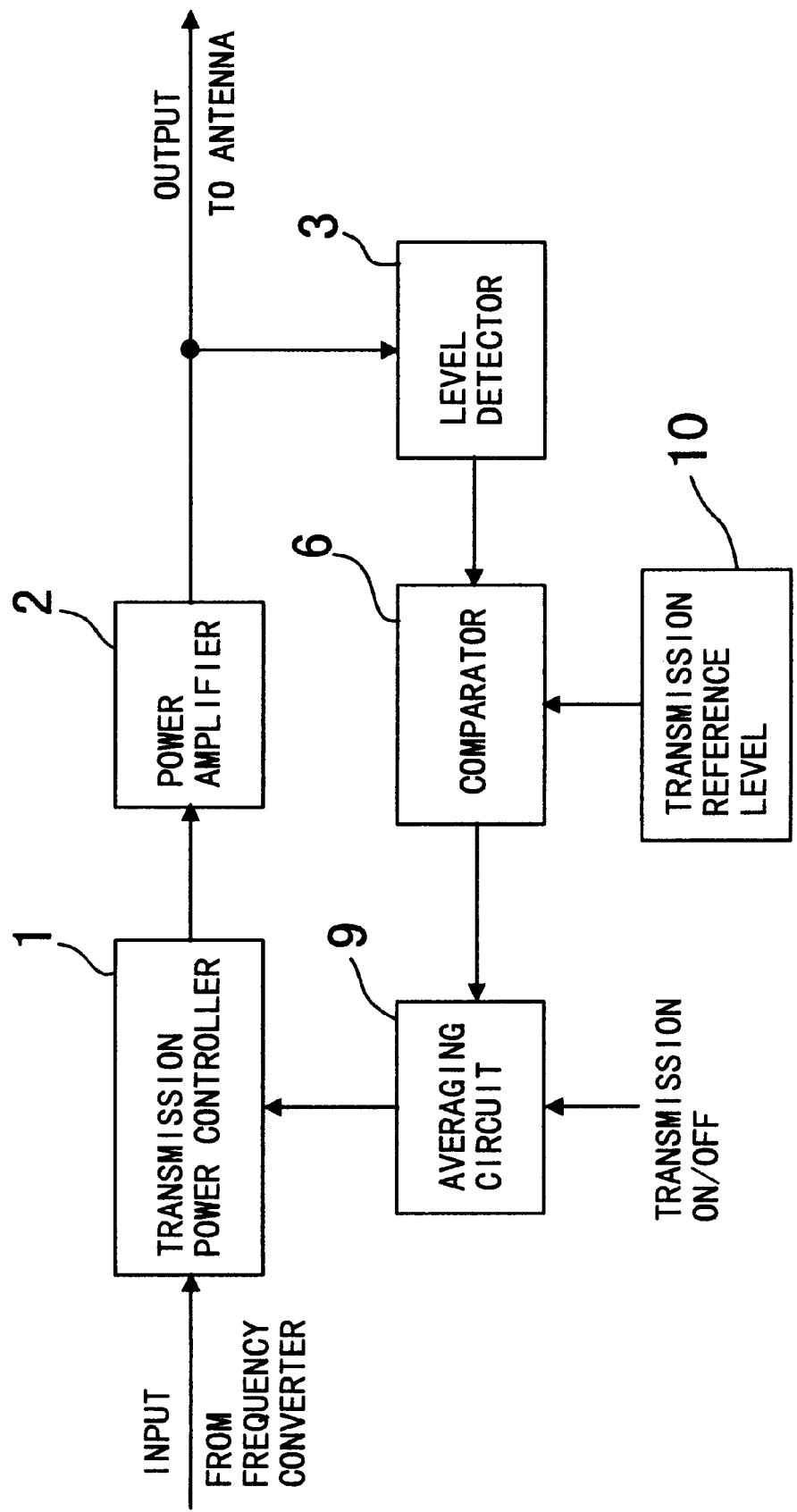
FIG. 4 is a block diagram showing a transmission section of a gateway station and a terminal/mobile station of the mobile radio satellite communication system of FIG. 3.
Figure 5:
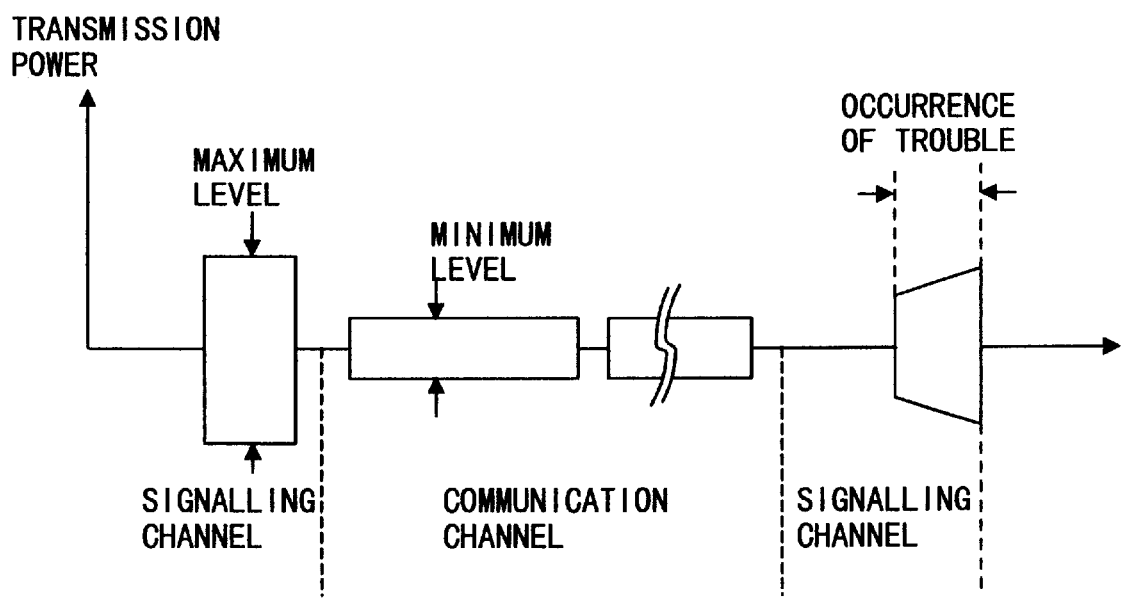
FIG. 5 is a time chart illustrating a variation of the transmission power by the transmission power control apparatus of FIG. 3.

FIG. 1 shows in block diagram a transmission power control apparatus for a mobile radio satellite communication system to which the present invention is applied. The transmission power control apparatus is incorporated in each of a gateway station and a terminal/mobile station such as the gateway stations 12 and the terminal/mobile stations 13 described hereinabove with reference to FIG. 3.

Referring to FIG. 1, the transmission power control apparatus is incorporated in a transmission section of each of gateway stations and terminals/mobile stations of a satellite communication system which effects call connection of the single channel per carrier (SCPC) or frequency division multiple access (FDMA) system based on a demand assignment, and includes a transmission power controller 1 for controlling the transmission level of a modulation signal frequency converted by a frequency converter (not shown), a power amplifier 2 for power amplifying an output of the transmission power controller 1 to a predetermined transmission level and outputting the power amplified signal to an antenna not shown, a level detector 3 for detecting the output level of the power amplifier 2, a control circuit 4 for analyzing reception information transmitted to the self station from the other party station and setting an optimum transmission level, a transmission level setting circuit 5 for outputting a reference signal of the transmission level set by the control circuit 4, a comparator 6 for comparing the transmission level detected by the level detector 3 with the reference signal of the preset transmission level, a discrimination circuit 7 for discriminating the polarity of a signal outputted from the comparator 6 and outputting a selection control signal of an average sample number (average time), a selection circuit 8 for selecting an average sample number in response to the selection control signal from the discrimination circuit 7, and an averaging circuit 9 for averaging a number of error levels successively outputted after each fixed interval of time from the comparator 6 designated by the selection circuit 8 to obtain a digital signal to be used as a control signal for the transmission power controller 1.

The averaging circuit 9 may be formed from an analog to digital (A/D) converter which receives an error component (analog signal) outputted from the comparator 6 and converts the error component into a digital signal with a predetermined sampling number.

In this instance, the predetermined sample number can be selected from between two average sample numbers L1 and L2 in response to an output of the discrimination circuit 7, and a digital signal produced based on the selected average sample number is used to control the transmission level of a modulation signal mentioned above by the transmission power controller 1.

Operation of the transmission power control apparatus having the construction described above is described below.

Transmission data to be transmitted first undergo coding processing such as error correction, differential operation and scrambling and are then digitally modulated, whereafter they are converted into a signal of a radio frequency by a frequency converter not shown. The transmission level of the signal is adjusted by the transmission power controller 1, and then, the signal is power amplified to a predetermined level by the power amplifier 2. The thus power amplified signal is sent out from the antenna (not shown) through a duplexer (not shown). Further, the transmission level of the signal being transmitted is monitored by the level detector 3.

The level with which the signal is to be transmitted is set to the transmission level setting circuit 5 by the control circuit 4, and tho transmission level setting circuit 5 produces a reference signal corresponding to one of the transmission levels.

The transmission level P detected by the level detector 3 and the reference signal R of the thus set transmission level are compared with each other by the comparator 6 to detect an error (P–R) of the transmission level P from the transmission level R. The error is averaged by the averaging circuit 9 while the polarity of the error (P–R) is discriminated by the discrimination circuit 7, and the average sample number of the averaging circuit 9 is controlled based on a result of the discrimination. Here, the two average sample numbers L1 and L2 are prepared in advance by the selection circuit 8, and one of the average sample numbers L1 and L2 is selectively determined based on a result of the discrimination of the discrimination circuit 7. The transmission power controller 1 is controlled with a result of the averaging of the error with the selected average sample number. Consequently, a transmission power control loop is formed from the elements 1, 2, 3, 6, 7, 8 and 9 described above.

If the average sample number of the averaging circuit 9 is set to a comparatively high value, then the response speed is comparatively low, but the control system operates stably, but if the comparatively small average sample number is selected, then the comparatively high response speed is obtained and convergence to the preset level is reached comparatively quickly.

If the detected transmission level P is lower than the preset transmission level R as seen from Table 1 below, that is, when P–R$\leq$0, the error is averaged with the comparatively large average sample number L1, but if the detected transmission level P is not higher than the preset transmission level R, that is, when P R>0, the error is averaged with the comparatively small average sample number L2 ($\geq$L1).

TABLE 1

Control Logic in Average Sample Number Selection

| Condition | Used average sample number |
|---|---|
| Detection level P < Preset transmission level R | L1 |
| Detection level P $\geq$ Preset transmission level R | L2 |

L1 $\geq$ L2

By the control in accordance with the logic, the transmission channel is changed over from the signalling channel 15 to the communication channel 16 such that, when the transmission level is to be changed over from the maximum transmission level which is a standard level to the designated low power level, until after the transmission level is stabilized at the preset level to effect stabilized transmission, the transmission level remains higher than the preset level, and consequently, the error from the preset level is averaged with the comparatively large average sample number L1. The average sample number L1 is set so that synchronization maintenance on the reception side can be performed without any trouble with the response speed then.

Then, when the transmission channel is changed over from the communication channel to the signalling channel and the transmission level is to be changed over from the low power level to the maximum transmission level which is a standard level, since the transmission level remains lower than the preset level until after it converges to the maximum transmission level, the error from the preset level is averaged with the comparatively low average sample number L2. The convergence to the preset transmission level is accelerated with the comparatively low average sample number L2 so that the transmission power is controlled to allow transmission with a predetermined level so that call connection can be performed stably even in a communication condition which is most severe for call connection.

The averaging circuit 9 described hereinabove need not be formed from an analog to digital converter, but may be formed from some other element having an equivalent function. For example, the averaging circuit 9 may be formed from a low-pass filter whose cutoff frequency can be controlled from the outside. In this instance, the output of the discrimination circuit 7 is inputted to the selection circuit 8, by which the cutoff frequency of the filter is controlled.

In particular, transmission power control is performed by control of the selection circuit 8 such that, where P$\square$R, the cutoff frequency is set to a comparatively low value to make the response speed low, but where P<R, the cutoff frequency is set to a comparatively high value to make the response speed high. By the transmission power control, the problem upon changing over from a control circuit to a communication channel can be prevented.

While a preferred embodiment of the present invention has been described using specific terms, such description is for illustrative purpose only, and it is to be understood that changes and variations may be made without departing from the spirit and scope of the following claims.

What is claimed is:

1. A transmission power control method for a mobile radio satellite communication system wherein a gateway station and a terminal/mobile station effect communication in a communication channel provided by demand assignment using a signalling channel via a communication satellite, comprising the step of:

controlling a transmission power control loop provided in any of said gateway station and said terminal/mobile station for controlling a transmission power of said gateway station or terminal/mobile station so that, when a transmission channel for current use is to be changed over from said signalling channel to said communication channel, a response speed of said transmission power control loop is set to a low value, but when the transmission channel for current use is to be changed over from said communication channel to said signalling channel, the response speed of said transmission power control loop is set to a high value.

2. A transmission power control apparatus for a mobile radio satellite communication system wherein a gateway station and a terminal/mobile station effect communication by a demand assignment using a signalling channel and a communication channel via a communication satellite, comprising:

a transmission power control loop provided in each of said gateway station and said terminal/mobile station fur controlling a transmission power of said gateway station or terminal/mobile station; and control means for controlling said transmission power control loop of each of said gateway station and said terminal/mobile station so that, when a transmission channel for current use is to be changed over from said signalling channel to said communication channel, a response speed of said transmission power control loop is set to a low value, but when the transmission channel for current use is to be changed over from said communication channel to said signalling channel, the response speed of said transmission power control loop is set to a high value.

3. A transmission power control apparatus for a mobile radio satellite communication system as claimed in claim 2, wherein said signalling channel is used for communication with said gateway station, said terminal/mobile station and a network control station, and the transmission power levels of said gateway station and said terminal/mobile station are set to the highest level.

4. A transmission power control apparatus for a mobile radio satellite communication system as claimed in claim 2, wherein said communication channel is used for communication between said gateway station and said terminal/ mobile station, and the transmission power levels of said gateway station and said terminal/mobile station are set to an optimum transmission level based on a reception level detected by one and transmitted to the other of said gateway station and said terminal/mobile station.

5. A transmission power control apparatus for a mobile radio satellite communication system as claimed in claim 2, wherein said transmission power control loop includes a transmission power controller for receiving an input signal and controlling a transmission level for the signal in accordance with a control signal, comparison means for detecting a transmission level of an output of said transmission power controller and comparing the detected transmission level with a preset transmission level to detect an error level of the detected transmission level from the preset transmission level, averaging means for controlling the response speed of said transmission power control loop based on the error level detected by said comparison means, and means for receiving an output of said averaging means and a producing a control signal controlling said transmission power controller so that the error level may be minimized.

6. A transmission power control apparatus for a mobile radio satellite communication system as claimed in claim 5, wherein said averaging means includes discrimination means for discriminating a polarity of the error level, conversion means for converting the error level from an analog signal into a digital signal for a period corresponding to a predetermined sample number, selection means for selecting the predetermined sampling number from within a plurality or average sample numbers based on an output of said discrimination means, and control means for averaging a number of error levels successively outputted after each fixed interval of time from said comparison means which is equal to the predetermined sample number selected by said selection means to obtain a digital signal to be used as the control signal for said transmission power controller.

7. A transmission power control apparatus for a mobile radio satellite communication system as claimed in claim 5, wherein said averaging means includes discrimination means for discriminating a polarity of the error level, a filter for receiving the error level, said filter having a cutoff frequency which is variable in response to a control signal, selection means for selecting the cutoff frequency of said filter based on an output of said discrimination means, and control means for controlling said transmission power controller through said filter with the cutoff frequency selected by said selection means.

8. A transmission power control apparatus for a mobile radio satellite communication system wherein a gateway station and a terminal/mobile station effect communication by a demand assignment using a signalling channel and a communication channel via a communication satellite, said transmission power control apparatus being provided in each of said gateway station and said terminal/mobile station, said transmission power control apparatus comprising:

a transmission power controller for receiving an input signal and controlling a transmission level for the signal in accordance with a control signal;

a power amplifier for power amplifying an output of said transmission power controller to a predetermined transmission level;

a level detector for detecting a transmission level of an output of said power amplifier;

a control circuit for analyzing reception information transmitted from the other one of said gateway station and said terminal/mobile station to set an optimum transmission level;

a comparison circuit for comparing the transmission level detected by said level detector with the optimum transmission level;

a discrimination circuit for discriminating a polarity of an output signal of said comparison circuit and outputting a selection control signal for an average sample number or average time;

a selection circuit for selecting an average sample number in accordance with the selection signal from said discrimination circuit; and an averaging circuit for averaging a number of error levels successively outputted after each fixed interval of time from said comparison circuit which is equal to the average sample number designated by said selection circuit to obtain a digital signal to be used as the control signal for said transmission power controller.

9. A transmission power control apparatus for a mobile radio satellite communication system wherein a gateway station and a terminal/mobile station effect communication by a demand assignment using a signalling channel and a communication channel via a communication satellite, said transmission power control apparatus being provided in each of a transmission section of said gateway station and said terminal/mobile station, said transmission power control apparatus comprising:

a transmission power controller for receiving an input signal and controlling a transmission level for the signal in accordance with a control signal;

a power amplifier for power amplifying an output of said transmission power controller to a predetermined transmission level;

a level detector for detecting a transmission level of an output of said power amplifier;

a control circuit for analyzing reception information transmitted from the other one of said gateway station and said terminal/mobile station to set an optimum transmission level;

a comparison circuit for comparing the transmission level detected by said level detector with the optimum transmission level;

a discrimination circuit fur discriminating a polarity of an output signal of said comparison circuit and outputting a selection signal for selecting a filter cutoff frequency;

a selection circuit for selecting a filter cutoff frequency in response to the selection signal from said discrimination circuit; and an averaging circuit including a filter of a variable cutoff frequency for averaging a number of error levels successively outputted after each fixed interval of time from said comparison circuit which corresponds to the cutoff frequency designated by said selection circuit to obtain a digital signal to be used as the control signal for said transmission power controller.

* * * * *